(12) United States Patent
Edholm

(10) Patent No.: US 6,378,823 B1
(45) Date of Patent: Apr. 30, 2002

(54) DEVICE FOR A FUEL TANK IN VEHICLES

(75) Inventor: Anders Edholm, Västra Frölunda (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/214,958

(22) PCT Filed: Jul. 9, 1997

(86) PCT No.: PCT/SE97/01250

§ 371 Date: Jan. 15, 1999

§ 102(e) Date: Jan. 15, 1999

(87) PCT Pub. No.: WO98/02324

PCT Pub. Date: Jan. 22, 1998

(30) Foreign Application Priority Data

Jul. 16, 1996 (SE) .............................. 9602789

(51) Int. Cl.[7] .............................................. A47B 96/06
(52) U.S. Cl. ................ 248/219.4; 180/68.5; 248/230.8; 248/503; 280/5; 280/833; 280/834
(58) Field of Search ................ 248/200, 201, 248/205.1, 232, 233, 309.1, 310, 313, 315, 316.1, 503, 230.8, 219.4; 280/834, 830, 838; 180/68.5

(56) References Cited

U.S. PATENT DOCUMENTS

| | | | | |
|---|---|---|---|---|
| 2,065,268 A | * | 12/1936 | Crary ......................... 280/838 |
| 2,090,059 A | * | 8/1937 | McClane ..................... 248/580 |
| 2,410,182 A | * | 10/1946 | Prior .......................... 280/834 |
| 2,902,240 A | * | 9/1959 | La Belle ...................... 248/201 |
| 4,013,300 A | * | 3/1977 | Berger ........................... 280/5 |
| D244,255 S | * | 5/1977 | Snyder ........................ D8/355 |
| 4,357,027 A | * | 11/1982 | Zeitlow .......................... 280/5 |
| 4,610,453 A | * | 9/1986 | Collier ....................... 280/834 |
| 4,925,235 A | * | 5/1990 | Fingerle .................. 296/180.2 |
| 5,799,916 A | * | 9/1998 | Lechner .................... 248/230.8 |
| 6,053,533 A | * | 4/2000 | Osborn et al. ............. 280/830 |

FOREIGN PATENT DOCUMENTS

DE           34 45 427 A1     7/1985

\* cited by examiner

Primary Examiner—Ramon O. Ramirez
Assistant Examiner—Tan Le
(74) Attorney, Agent, or Firm—Lerner, David, Littenberg, Krumholz & Mentlik, LLP

(57) ABSTRACT

The present invention relates to a device for vehicle fuel tanks, which includes a tank (1) having a rounded rectangular cross section with rounded corners (5–8) and an upper limiting plane (15) which substantially coincides with the upper side (9) of the tank. A lower limiting plane (16) coincides substantially with the bottom side (10) of the tank. Carrying brackets (2) cooperate with a flexible strapping unit (3) for attaching the tank to the vehicle. The carrying brackets (2) are shaped as a substantially vertical cradle, having a web (21) and a support surface (30) facing the inner side (12) of the tank and, at the top, merging into an upper support protrusion (22) and, at the bottom, merging into a lower, laterally pointing support protrusion (23). Both support protrusions have a support surface (31, 32) arranged to bear on respective rounded corner (7, 8) of that tank. The cradle extends vertically so that the upper support protrusion (22) is substantially under the upper limiting plane (15) and the lower support protrusion (11) is substantially above the lower limiting plane (16).

12 Claims, 2 Drawing Sheets

DEVICE FOR A FUEL TANK IN VEHICLES

TECHNICAL FIELD

The present invention relates to a device for a fuel tank in vehicles, in particular a device for supporting and holding the tank to the vehicle, in the form of at least one support bracket which is attached to the vehicle and provided with means for holding the tank to the support bracket.

BACKGROUND OF THE INVENTION

So far, the most widely used solution for carrying a fuel tank, in particular for heavy vehicles, is to utilize an L-shaped support bracket which protrudes under the tank and which cooperates with tightening straps which are mounted on the outer ends of the support bracket and which together with the bracket extend around the tank and thereby hold it to the bracket. In this regard, the tank is usually rectangular and presents corner portions which are slightly rounded. As regards this type of support bracket, the component protruding under the tank requires some space in the vertical direction. This implies that the total space intended for the tank and the bracket cannot be utilized effectively for storing of fuel, since the requirement as regards ground clearance puts a limit to the space in the downwards direction. Furthermore, circular tanks are known, which involve a drawback due to the fact that they offer less volume and also tend to rotate in their mounting assembly, which in turn exerts forces on the tank assembly, i.e. its connectors for the connecting conduits.

For reasons of safety, circular tanks normally require particular side impact protection devices due to their shape. This increases the weight and cost of the vehicle.

From DE-A1-3,445,427, a fuel tank having two brackets which are integrated with the tank is previously known. This has been accomplished by the tank being particularly provided with threaded bushing inserts which allow the tank to be screwed directly to the bracket. This solution is very costly as regards both manufacturing and assembly. Furthermore, the bracket protrudes a certain distance above the top side of the tank, which implies that neither this known solution involves an optimum use of the space which is available for fuel storage.

SUMMARY OF THE INVENTION

The object of the present invention is to provide a device for a fuel tank in which the available space is used in an optimum manner for storing the fuel and which tank is maintained securely in a selected position.

Said object is accomplished by means of a device according to the present invention, in which the support bracket forming part thereof is designed with a cradle, the vertical extension of which lies essentially within the upper and lower limiting planes of the tank.

Due to the fact that the support bracket generally does not protrude beyond the vertical dimensions of the tank, the tank can be dimensioned in an optimum manner for maximum fuel volume, while still maintaining a reliable retaining function and without the need for fastening means directly integrated with the tank.

BRIEF DESCRIPTION OF THE DRAWINGS

The invention will be described in the following in the form of an embodiment and with reference to the appended drawings, in which.

PREFERRED EMBODIMENT

Figure 1:
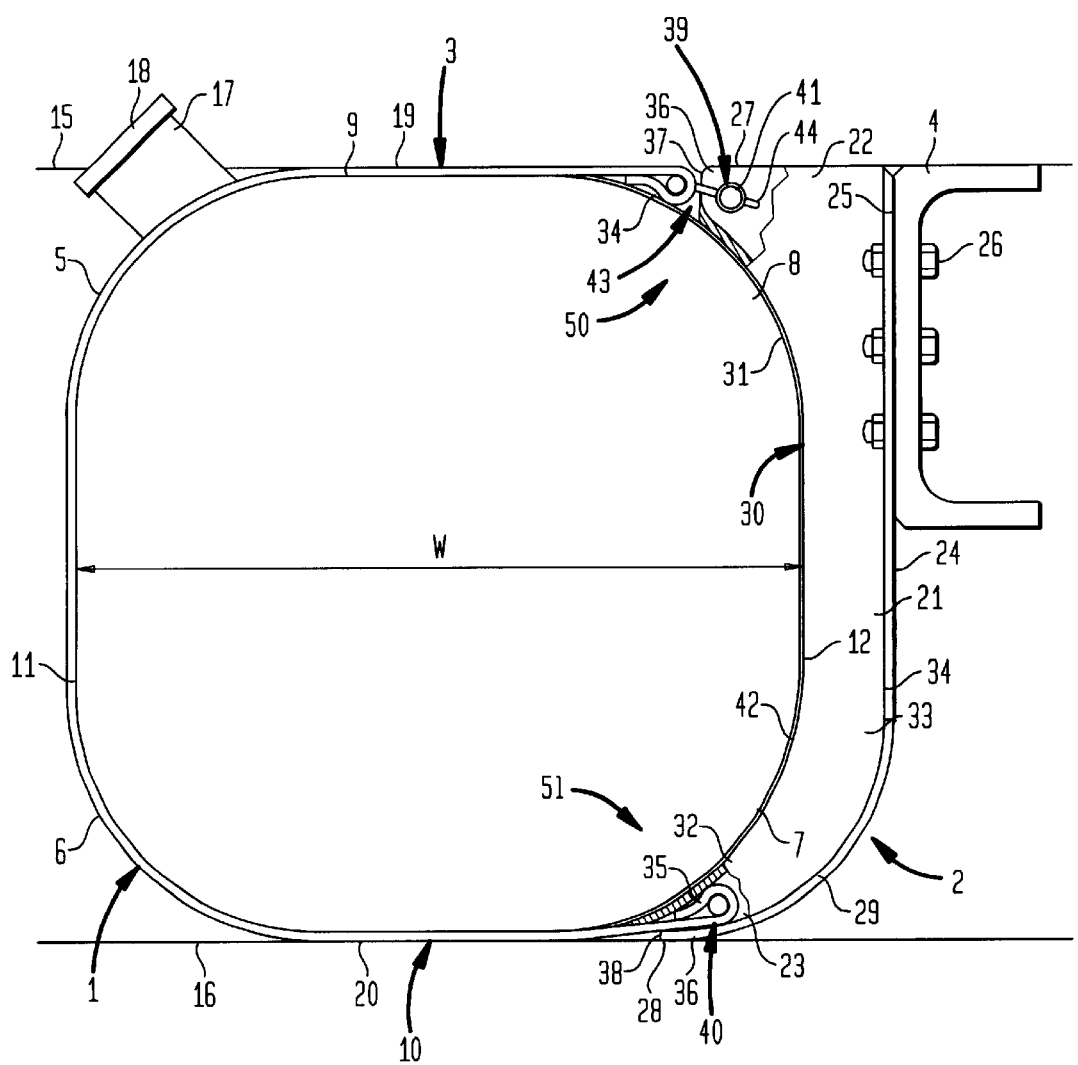
FIG. 1 shows an end view of the device according to the invention, for carrying and retaining a fuel tank.
Figure 2:
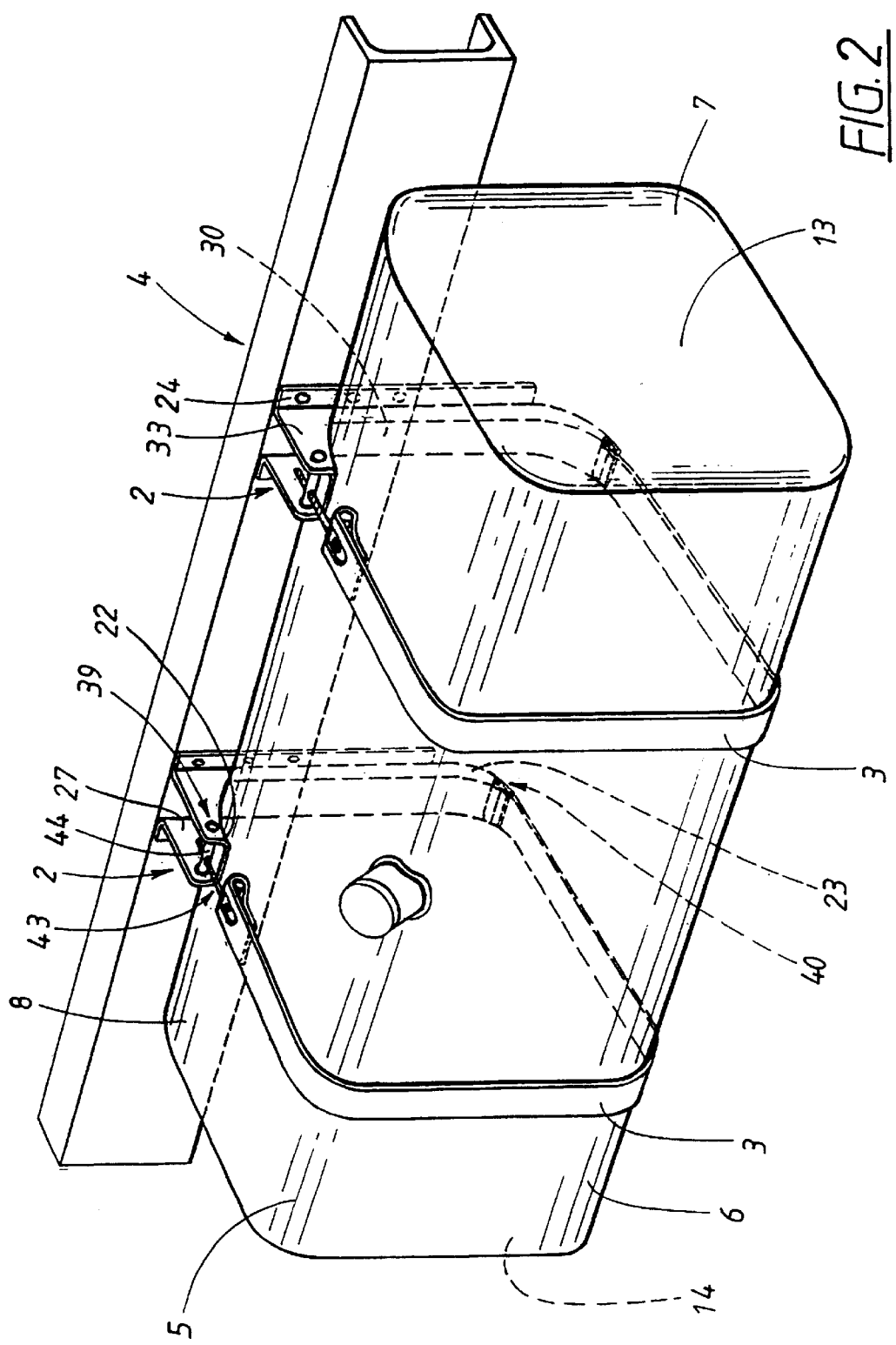
FIG. 2 shows a perspective view of the device and the fuel tank according to FIG. 1.

As is apparent from FIGS. 1 and 2, the device according to the invention is intended for supporting and retaining a fuel tank 1 essentially by means of two or more support brackets 2, according to the shown embodiment two support brackets 2, and a corresponding number of tightening straps 3 which are joined to the support brackets and which together with the corresponding support bracket extend around the fuel tank 1. The tank is primarily of the type which is mounted on heavy vehicles such as trucks, buses and the like and which is mounted along the side of the vehicle under a load-container or a vehicle body, usually on a longitudinally extending part of the vehicle, for example its chassis, in the shown example in the form of a longitudinally extending U-beam 4. The fuel tank is essentially shaped as a parallelepiped or as a box, having an essentially rectangular cross-section with relatively rounded edge portions 5, 6, 7, 8 or corner portions. In this manner, the tank presents a top side 9, a bottom side 10, an outer side 11 and an inner side 12. These sides consist either of plane or slightly cambered portions which adjoin the rounded corner portions 5–8. In addition to these limiting surfaces, the tank presents two opposite end sides 13, 14 which can be plane or cambered. The top side 9 of the tank 1 generally defines the upper limiting plane of the tank, which is indicated by means of a chain line 15, whereas the bottom side 10 of the tank generally defines the lower limiting plane of the tank, which is indicated by means of a chain line 16. Only a filling tube 17 with a cap 18 protrudes above the upper limiting plane 15. However, said components extend in the lateral direction and normally protrude outside a vehicle bodywork, if such is provided, directly on top of the fuel tank and consequently do not steal any space from the tank in the vertical direction. The upper part of the tank 1 is also provided with a not shown tank assembly in the form of connectors for a fuel pipe and a level sensor. The positioning of the assembly is also chosen in a manner so that it does not affect the total space required in the vertical direction. A drain plug can also be arranged in the bottom side 10 of the tank, which plug also protrudes slightly beyond the lower limiting plane 16 of the tank. However, this does not have any practical importance as regards the total use of the space. The exact location of the upper and lower limiting planes 9, 10 can either be directly coinciding with the top side and the bottom side, respectively, or more precisely, and according to the present case, can be level with the top side 19 and the bottom side 20, respectively, of the tightening strap 3. However, this has no practical importance due to the moderate thickness of the strap, which usually is less than 2 mm. Furthermore, in connection with the tightening strap, the perimeter surface or mantle surface of the tank can be provided with guide beads on each side of each tightening strap. However, this has no practical importance either as regards the definition of the upper and lower limiting planes 9, 10.

In accordance with the invention, each support bracket 2 is generally designed as a vertically extending cradle which comprises a web 21 extending vertically along the inner side 12 of the tank and, in its upper portion, merging it to an upper support protrusion 22 and, in its lower portion, merging into a lower support protrusion 23. The web 21 presents a mounting side 24 which preferably is completely plane and normally extends vertically, having at least one upper portion which is in contact with the outside 25 of the vehicle beam 4. As regards fastening, a number of mounting screws 26 are in a conventional manner inserted through holes in the beam and a mounting surface 24 and are tightened by means of nuts.

In accordance with the invention, the upper end of the support bracket 2 is furthermore designed in a manner so that its upper edge line 27 generally does not extend above the upper limiting plane 15 of the tank 1 and so that its lower end surface 28, in a corresponding manner, does not extend below the lower limiting plane 20 of the tank. In the shown example, the upper end surface 27 is plane and coincides with the upper limiting plane 19, whereas the lower end surface 28 also presents a plane portion which coincides with the lower limiting plane 16 and continues as a heavily rounded portion 29.

In accordance with the invention, the support bracket 2 presents a support surface 30 which faces the tank 1 and which is entirely shaped in accordance with the tank's contour shape, along the contact surface between the tank and the support surface of the support bracket. More precisely, the support surface extends in a generally plane or slightly cambered manner in the vertical direction, along the inner side 12 of the tank. In its upper portion, it changes to a concave, preferably circular, arc-shaped and rounded portion 31 corresponding to the preferably circular, arc-shaped and rounded corner portion 8 of the tank and forms a support surface for the upper support protrusion 22. Also, in its lower parts it changes to a corresponding concavely rounded, lower support surface 32 of the lower support protrusion 23, which is also formed in accordance with the corresponding rounded corner portion 7 of the tank, i.e. it presents the same radius of curvature as said corner portion.

The brackets 2 with their protrusions 22, 23 extend above and below the tank, preferably approximately 20% of the tank's width or transverse cross-dimension ("W" as shown in FIG. 1), though less than approximately 30% of the width. The support brackets 2 can be manufactured from sheet steel or aluminum which is designed so that the cross-section defines a suitable profile. According to the shown example, a profile shape generally resembling a hat profile and comprising two mounting flanges is chosen, which flanges define the support surface 24 against the beam 4 and two mutually parallel side walls 33 and the support surface 30 facing the tank. The side walls 33 are situated at such a distance that a space is formed therebetween, which space presents a width accommodating the width of the tightening strap 3. The mounting ends 34, 35 of the tightening strap are connected both to the front end section 36 of the upper support protrusion 22 and the front end section 36 of the lower support protrusion 23, through an opening 37, 38 in the respective portion and to a mounting location 39 and 40, respectively, in the respective support protrusion. The mounting ends 34, 35 comprise a loop-shaped, riveted end of the tightening strap, which in its lower portion runs about a lower mounting pin 41 forming part of the lower mounting location 40. Said pin extends between the parallel side walls 33 of the support bracket in each support protrusion, and are for example mounted in opposite holes in the side walls. In a corresponding manner, an upper mounting pin 41 is mounted between holes in the upper support protrusion 22. For tightening the tightening strap 3, thereby providing the embracing force against the tank 1, the upper end section of the band is provided with a tightening device 43 having a tightening screw 44. Said screw can be screwed into a threaded hole in the mounting pin 41 and is inserted through a hole in a tightening pin 45 in the loop-shaped end of the strap and can be accessed via an opening in the band provided for the tightening thereof. For practical reasons, the mounting locations which are formed of the two mounting pins 41 are situated slightly below and above, respectively, the upper and lower limiting plane 15, 16, respectively. In this manner, the tightening band is urged against the upper side 9 and lower side 10, respectively, of the tank. The embracing force or retaining force of the tightening strap presents a resulting force which is directed essentially horizontally towards the vertical cradle.

By means of the above-mentioned arrangement, an effective and reliable securing of a fuel tank is accomplished, which in combination with the retaining function is highly optimized as regards the space available by means of the rectangular basic shape, without the bracket protruding in the vertical direction beyond the limiting planes of the fuel tank. In this manner, the tank can be dimensioned so as to utilize the available space in the vehicle in an optimum manner. Due to the supporting function of the web 21 and the protrusions 22, 23 together with the retaining action of the tightening strap 3, no further fastening means are required which keeps the manufacturing and assembly costs to a low level. By means of the relatively plane outer side 11 of the tank, no separate side impact protection devices are required, which reduces the weight and additionally saves costs.

The invention is not limited to the above-mentioned embodiment shown in the drawings, but can be varied within the scope of the appended claims. For example, the two shown support brackets can be replaced by one single wide bracket, or a larger number of brackets, depending on the longitudinal extension of the tank. The mounting of the tightening strap can be solved in other ways. Furthermore, the tightening strap can be replaced by another tightening element, such as a wire, cable, chain or the like. The brackets can be given a plurality of alternative profile shapes which provide a mounting surface towards the vehicle and a shape-locked support surface towards the tank, i.e. a support surface extending along the non-circular cross-sectional shape of the tank so as to prevent it from rotating.

Even if the bracket generally does not protrude in the upwards or downwards direction beyond the horizontal limiting planes of the tank, the scope of the invention still comprises the fact that the tank can protrude slightly, such as approximately 1–4% of the height of the tank, i.e. its vertical dimension. The tightening device need not be arranged on the end of the tightening strap, but may alternatively be placed at a distance from the mounting locations of the strap, for example on its midpoint.

What is claimed is:

1. An assembly for mounting a fuel tank in a vehicle, comprising:
    a) at least one bracket having an upper end, a lower end, a planar mounting side, and a web extending perpendicularly from said mounting side, said web including a support surface including a first portion of the support surface corresponding to a first corner portion of a fuel tank, a second portion of the support surface corresponding to a second corner portion of a fuel tank, and a vertical portion of the support surface extending vertically between said first portion of the support surface and said second portion of the support surface; and
    b) a flexible tightening element adapted to be connected to said upper end and said lower end so that said tightening element is disposed at or below said upper end and at or above said lower end and so that said upper end and said lower end prevent rotation of the tank.

2. The assembly of claim 1, wherein said upper end and said lower end are adapted to connect with said tightening element and said tightening element is connected to said bracket so as to apply a tightening force in a direction towards said bracket.

3. The assembly of claim 1, wherein said support surface includes a vertical support surface shaped to correspond to the shape of a side of a fuel tank.

4. The assembly of claim 3, wherein said upper support surface and said lower support surface are shaped to correspond to the shape of a rounded corner of a fuel tank.

5. The assembly of claim 1, wherein said upper end and said lower end have a length of between about 20% and 30% of a width of said tank.

6. A mounted fuel tank, comprising:
   a) a fuel tank having a generally rectangular shape including a top planar side and at least a first rounded corner portion and a second rounded corner portion;
   b) at least one bracket having a a planar mounting side, and a web extending perpendicularly from said mounting side, said web having a support surface extending from an upper end of said web to a lower end of said web for connecting to the vehicle,
   c) said support surface including a first portion at said upper end corresponding to said first corner portion of said fuel tank so that said upper end does not extend above said top side of said tank a second portion at said lower end corresponding to said second corner portion of said fuel tank, and a vertical support surface extending vertically between said first portion and said second portion; and
   d) a flexible tightening element connected to said upper end and said lower end so that said tightening element is disposed at or below said upper end and at or above said lower end, so that said upper end and said lower end prevent rotation of the tank, and so that said upper end does not extend above said top side of said tank when said tank is disposed at or below the upper limiting plane on the vehicle.

7. The assembly of claim 6, wherein said upper end and said lower end are adapted to connect with said tightening element and said tightening element is connected to said bracket so as to apply a tightening force to aid tank in the direction towards said bracket.

8. The assembly of claim 6, wherein said vertical support surface extends along a vertically extending side of said tank.

9. The assembly of claim 6, wherein said support surface includes a vertical support surface shaped to correspond to the shape of a side of said tank.

10. The assembly of claim 9, wherein said upper support surface and said lower support surface are shaped to correspond to the shape of a rounded corner of said tank.

11. The assembly of claim 6, wherein said upper end extends over a top side of said tank and said lower end extends under a bottom side of said tank.

12. The assembly of claim 11, wherein said upper end and said lower end extend between about 20% and 30% of a width of said tank.

* * * * *

UNITED STATES PATENT AND TRADEMARK OFFICE
CERTIFICATE OF CORRECTION

PATENT NO. : 6,378,823 B1
DATED : April 30, 2002
INVENTOR(S) : Anders Edholm

It is certified that error appears in the above-identified patent and that said Letters Patent is hereby corrected as shown below:

Title page,
Item [57], "cross section" should read -- cross-section --

Column 4,
Line 20, "required which" should read -- required, which --

Column 6,
Line 13, "aid" should read -- said --

Signed and Sealed this

Sixteenth Day of July, 2002

Attest:

JAMES E. ROGAN
Attesting Officer
Director of the United States Patent and Trademark Office